(12) United States Patent
Aritani

(10) Patent No.: US 12,392,404 B2
(45) Date of Patent: Aug. 19, 2025

(54) JIG, METHOD FOR ASSEMBLING ROBOT USING JIG, AND ROBOT

(71) Applicant: FANUC CORPORATION, Yamanashi (JP)

(72) Inventor: Takuya Aritani, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 59 days.

(21) Appl. No.: 18/548,265

(22) PCT Filed: Apr. 13, 2021

(86) PCT No.: PCT/JP2021/015236
§ 371 (c)(1),
(2) Date: Aug. 29, 2023

(87) PCT Pub. No.: WO2022/219692
PCT Pub. Date: Oct. 20, 2022

(65) Prior Publication Data
US 2024/0141978 A1 May 2, 2024

(51) Int. Cl.
*F16H 57/00* (2012.01)
*B25J 9/10* (2006.01)

(52) U.S. Cl.
CPC .............. *F16H 57/00* (2013.01); *B25J 9/102* (2013.01); *F16H 2057/0056* (2013.01); *F16H 2057/0062* (2013.01)

(58) Field of Classification Search
CPC ............. F16H 57/00; F16H 2057/0056; F16H 2057/0062; B25J 9/102
See application file for complete search history.

(56) References Cited

U.S. PATENT DOCUMENTS 9,194,480 B2 * 11/2015 Henkel ................. F16H 57/023

FOREIGN PATENT DOCUMENTS

| JP | H10115328 A | 5/1998 |
|---|---|---|
| JP | 2009002422 A | 1/2009 |
| JP | 2011064253 A | 3/2011 |
| JP | 2013044351 A | 3/2013 |

* cited by examiner

*Primary Examiner* — Terence Boes
(74) *Attorney, Agent, or Firm* — Maier & Maier, PLLC

(57) ABSTRACT

A jig includes: a first gear part that can be meshed with an input gear disposed in a casing by being inserted into the casing from the outside of the casing; a torque application part that is fixed to the first gear part, is disposed outside the casing in a state in which the first gear part is meshed with the input gear, and is capable of applying a torque about a first axis, which corresponds to an axis of the first gear part, to the first gear part; and a phase indicator provided on the torque application part to indicate the phase of the first gear part about the first axis.

10 Claims, 8 Drawing Sheets

JIG, METHOD FOR ASSEMBLING ROBOT USING JIG, AND ROBOT

The present disclosure relates to a jig, a method for assembling a robot using the jig, and a robot.

BACKGROUND

A known gear mechanism includes a plurality of gears that transmit the rotation of the rotary axis of a motor to a driven member (for example, see Japanese Unexamined Patent Application, Publication No. 2013-44351).

In this gear mechanism, holes are provided in an input gear to be meshed with a motor pinion provided on the rotary axis of the motor and in an output gear that is coupled to the driven member. By inserting positioning pins through the respective holes to position the gears, the phases of the gears are matched.

SUMMARY

An aspect of the present disclosure is a jig including: a first gear part that can be meshed with an input gear disposed in a casing by being inserted into the casing from an outside of the casing; a torque application part that is fixed to the first gear part, is disposed outside the casing in a state in which the first gear part is meshed with the input gear, and is capable of applying a torque about a first axis, which corresponds to an axis of the first gear part, to the first gear part; and a phase indicator provided on the torque application part to indicate a phase of the first gear part about the first axis.

DETAILED DESCRIPTION OF EMBODIMENTS

A jig 1 according to an embodiment of the present disclosure and a method for assembling a robot 100 using the jig 1 will be described below with reference to the drawings.

Figure 2:
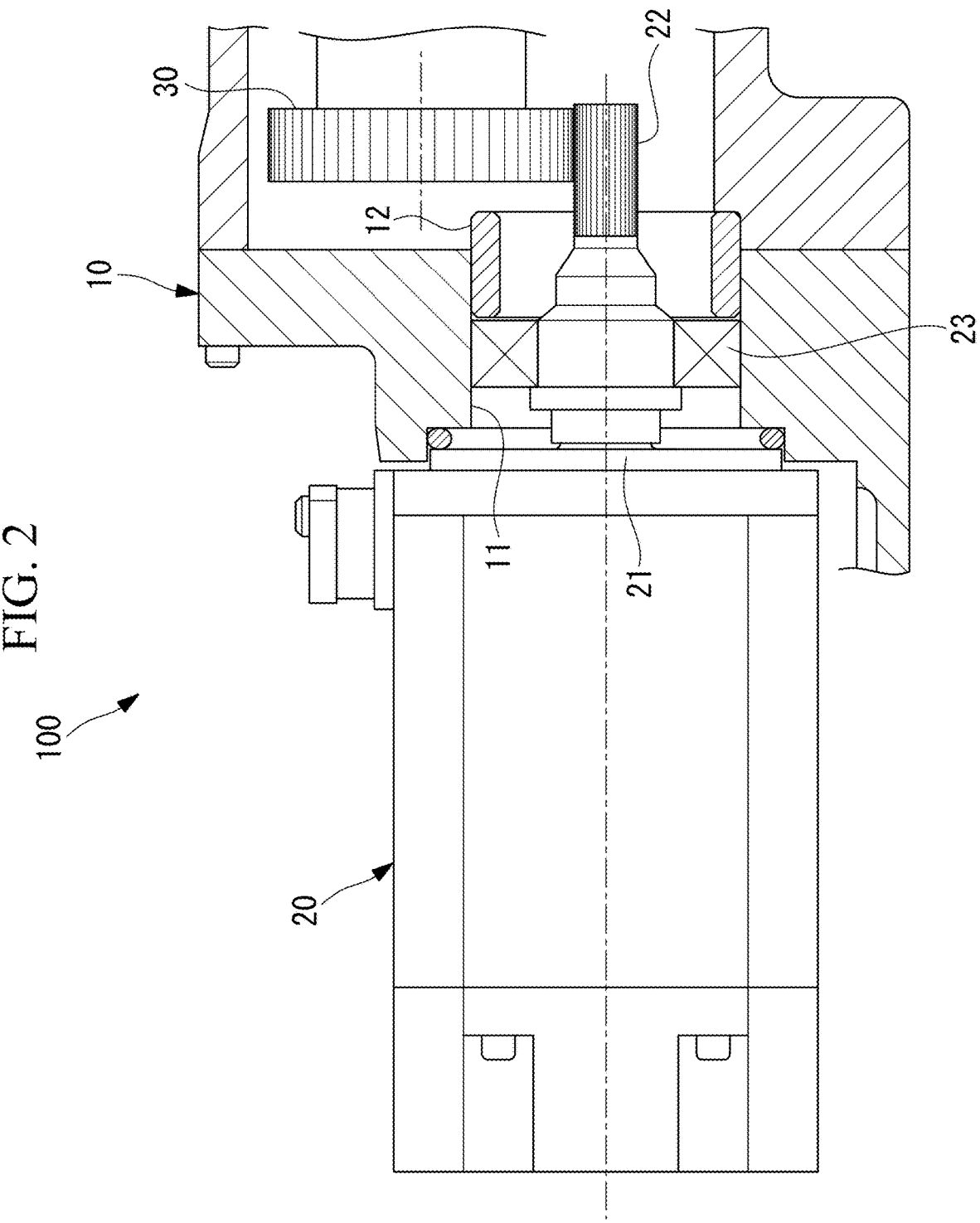
FIG. 2 is a partial vertical sectional view showing a part of a robot using the jig in FIG. 1.

As shown in FIG. 2, the robot 100 assembled using the jig 1 according to this embodiment includes a casing 10 having an opening 11 and accommodating an input gear 30 therein, and a motor 20 removably attached to the opening 11 in the casing 10. A drive gear 22 that is meshed with the input gear 30 in a state in which the motor 20 is attached to the casing 10 is attached to a shaft 21 of the motor 20. A bearing 23 that is fitted to the inner surface of the opening 11 and supports the rotation of the drive gear 22 is disposed at the proximal end of the drive gear 22.

The opening 11 penetrates through the casing 10 in the axial direction of the input gear 30.

The drive gear 22 and the input gear 30 are gears, such as spur gears or helical gears, that can be meshed with each other by moving the drive gear 22 parallel to the axis of the input gear 30, relative to the input gear 30.

The bearing 23 is disposed at a position away from the distal end toward the proximal end of the drive gear 22 so as to start to fit into the opening 11 in the casing 10 before the drive gear 22 starts to be meshed with the input gear 30. Reference sign 12 in the drawing denotes a spacer for applying a preload to the bearing 23.

Figure 1:
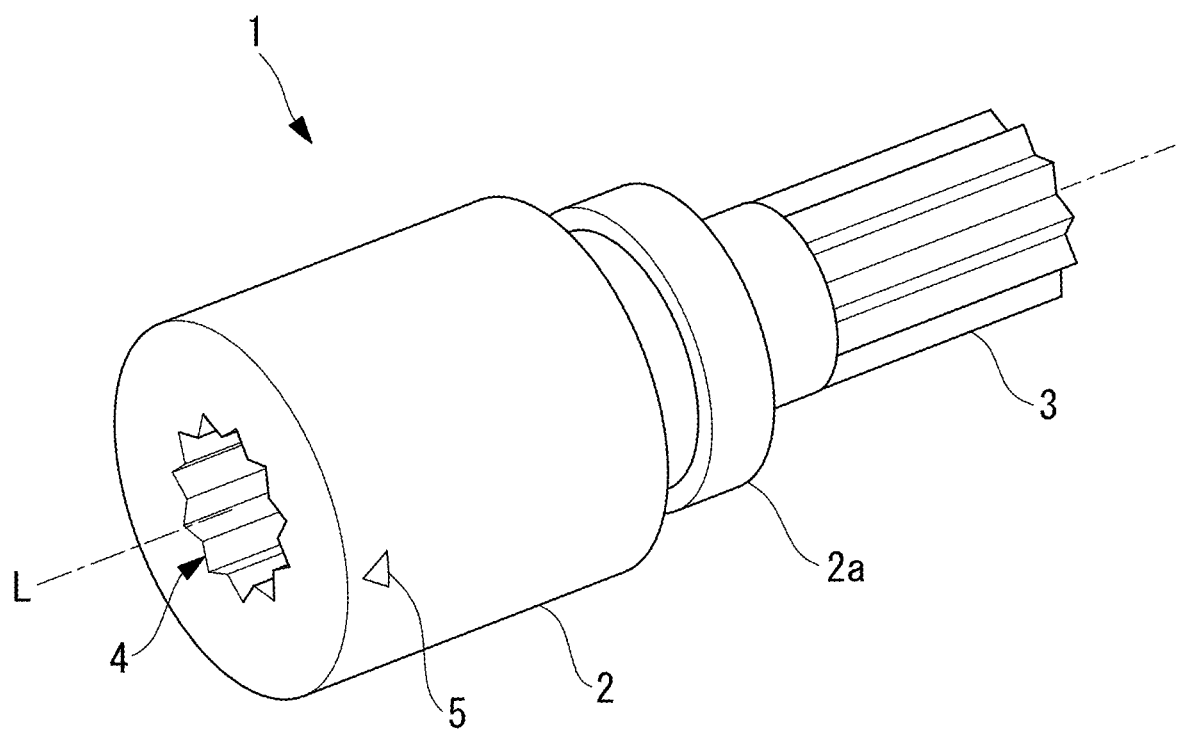
FIG. 1 shows the overall configuration of a jig according to an embodiment of the present disclosure.

As shown in FIG. 1, the jig 1 includes a cylindrical barrel part (torque application part) 2 having a central axis corresponding to a predetermined axis (first axis) L, an external gear part (first gear part) 3 provided at one end of the barrel part 2 in the axis L direction, and an internal gear part (second gear part) 4 provided at the other end of the barrel part 2 in the axis L direction.

The external gear part 3 and the internal gear part 4 are disposed coaxially with the axis L. The external gear part 3 is provided on the outer surface of a shaft protruding from one end face of the barrel part 2 in the axis L direction, and the internal gear part 4 is formed in the inner surface of a hole recessed from the other end face of the barrel part 2 in the axis L direction.

The external gear part 3 has a plurality of external teeth that can be meshed with the input gear 30. More specifically, the external gear part 3 has the same shape as the drive gear 22.

The lengths of the external gear part 3 and the barrel part 2 in the axis L direction are set to such dimensions that at least the other end of the barrel part 2 is exposed to the outside of the casing 10 in a state in which the external gear part 3 is meshed with the input gear 30.

The internal gear part 4 has a plurality of internal teeth that can be meshed with the drive gear 22 fixed to the shaft 21 of the motor 20. The internal gear part 4 has, for example, a cross-sectional shape complementary to the cross-sectional shape of the drive gear 22, so that the drive gear 22 can be fitted tightly into the internal gear part 4.

The phase of the internal gear part 4 about the axis L with respect to the external gear part 3 is set to such a phase relationship that the drive gear 22, when arranged in the same phase as the external gear part 3, can be meshed with the internal gear part 4 simply by moving the drive gear 22 in the axis L direction.

The outer diameter of the barrel part 2 is set to such a dimension that an operator can grip the outer circumferential surface of the barrel part 2 and apply a torque greater than the brake torque of the motor 20 about the axis L in a state in which the internal gear part 4 is meshed with the drive gear 22 fixed to the shaft 21 of the motor 20. Specifically, the barrel part 2 has such a shape that the point of application of a force to be applied in the tangential direction about the axis L can be set at the position of the outer circumferential surface of the barrel part 2, which is away from the axis L in the radially outward direction.

A mark (phase indicator) 5 is provided on the outer circumferential surface of the barrel part 2.

For example, as shown in FIG. 1, the mark 5 is a triangular engraving formed in the outer circumferential surface of the barrel part 2 and is formed in the vicinity of the other end of the barrel part 2 exposed to the outside of the casing 10 in a state in which the external gear part 3 is meshed with the input gear 30. The mark 5 indicates a phase in which the central vertex in the circumferential direction coincides with, for example, the center of one external tooth of the external gear part 3 in the tooth thickness direction and the center of one tooth groove of the internal gear part 4 in the width direction. Hence, even in a state in which the external gear part 3 is meshed with the input gear 30 in the casing 10, it is possible to know the phase, about the axis L, of the external gear part 3 meshed with the input gear 30 by checking the mark 5 exposed to the outside of the casing 10. Similarly, even in a state in which the internal gear part 4 is meshed with the drive gear 22, and thus the drive gear 22 cannot be seen, it is possible to know the phase of the drive gear 22 about the axis L by checking the mark 5.

A bearing (guide part) 2a is attached to the outer circumferential surface at one end of the barrel part 2. The bearing 2a has the same outer diameter as the bearing 23 and is disposed in the same positional relationship with respect to the tip of the external gear 3 as the positional relationship of the bearing 23 with respect to the tip of the drive gear 22.

A method of assembling the robot 100 using the thus-configured jig 1 according to this embodiment will be described below.

Figure 3:
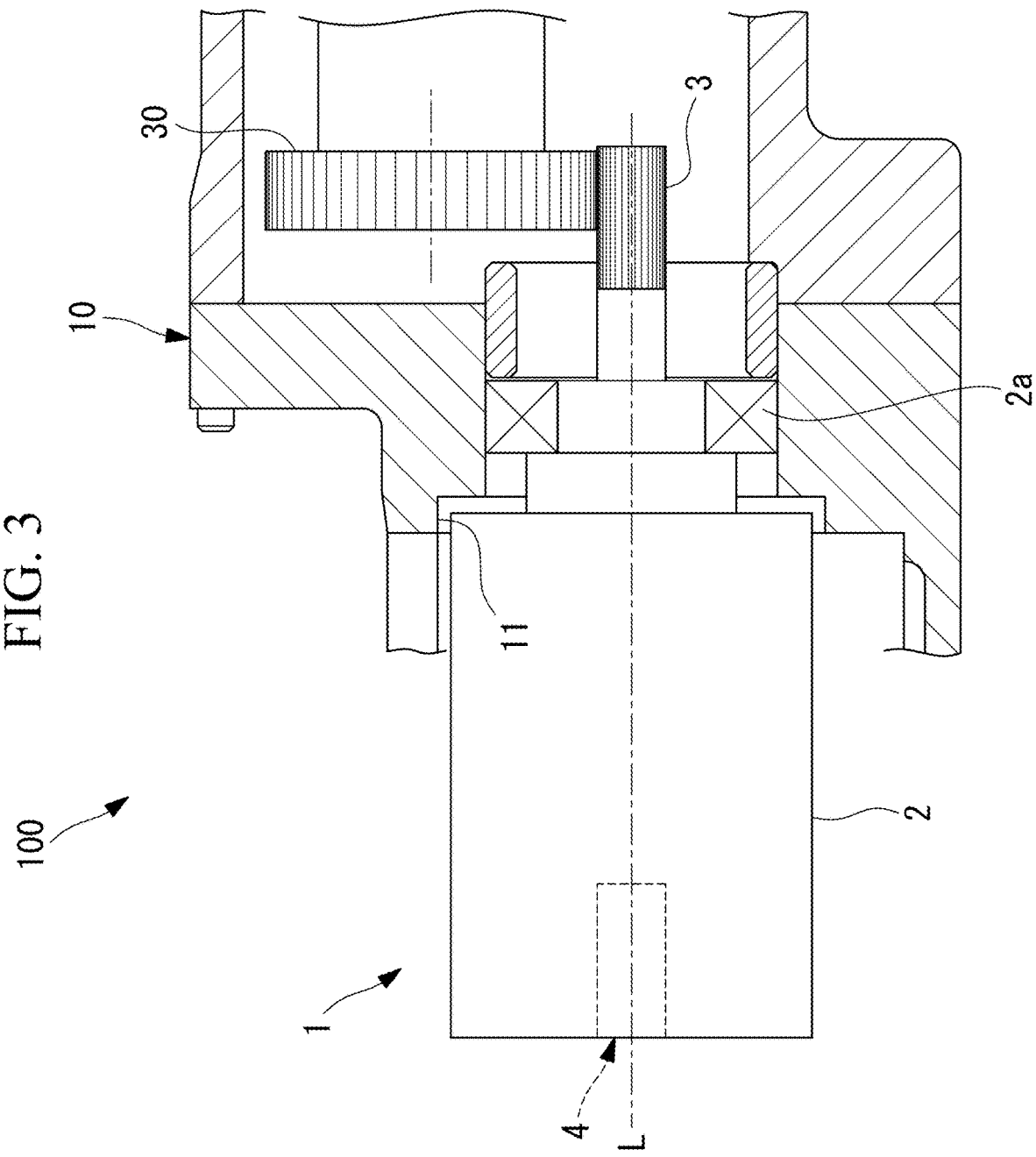
FIG. 3 is a partial vertical sectional view showing a part of the robot to which the jig in FIG. 1 is attached.

In the assembling method according to this embodiment, in a state before the motor 20 is mounted into the casing 10, first, as shown in FIG. 3, the external gear part 3 of the jig 1 is inserted from the outside of the casing 10 into the casing 10 through the opening 11.

Before the external gear part 3 starts to be meshed with the input gear 30 inside the casing 10, the bearing 2a provided at one end of the barrel part 2 starts to fit into the inner surface of the opening 11. By rotating an inner ring with respect to an outer ring of the bearing 2a, rotation of the external gear part 3 about the axis L is guided. Furthermore, by advancing fitting of the outer ring of the bearing 2a into the opening 11, movement of the external gear part 3 in the direction of the axis L is guided. By moving the external gear part 3 in the direction of the axis L while rotating, with the torque applied to the barrel part 2, the external gear part 3 about the axis L to search for a phase in which the external gear part 3 is meshed with the input gear 30, the external gear part 3 can be smoothly meshed with the input gear 30.

Then, in a state in which the external gear part 3 is meshed with the input gear 30, the operator checks the position of the mark 5 indicated on the barrel part 2. When the mark 5 is not positioned at a desired position, the operator applies a torque about the axis L to the barrel part 2 to rotate the barrel part 2 and the external gear part 3 about the axis L, so that the mark 5 is positioned at the desired position. In this way, it is possible to arrange the external gear part 3 in a desired phase and to arrange the input gear 30 in a phase in which the input gear 30 is meshed with the external gear part 3 arranged in the desired phase. The desired phase is, for example, a phase in which the central vertex of the mark 5 is positioned vertically upward. Herein, the positional arrangement of the mark 5 does not necessarily need to be strictly performed.

Then, by removing the jig 1 from the casing 10 so as not to rotate the input gear 30 from this state, the task of adjusting the phase of the input gear 30 is completed.

Figure 4:
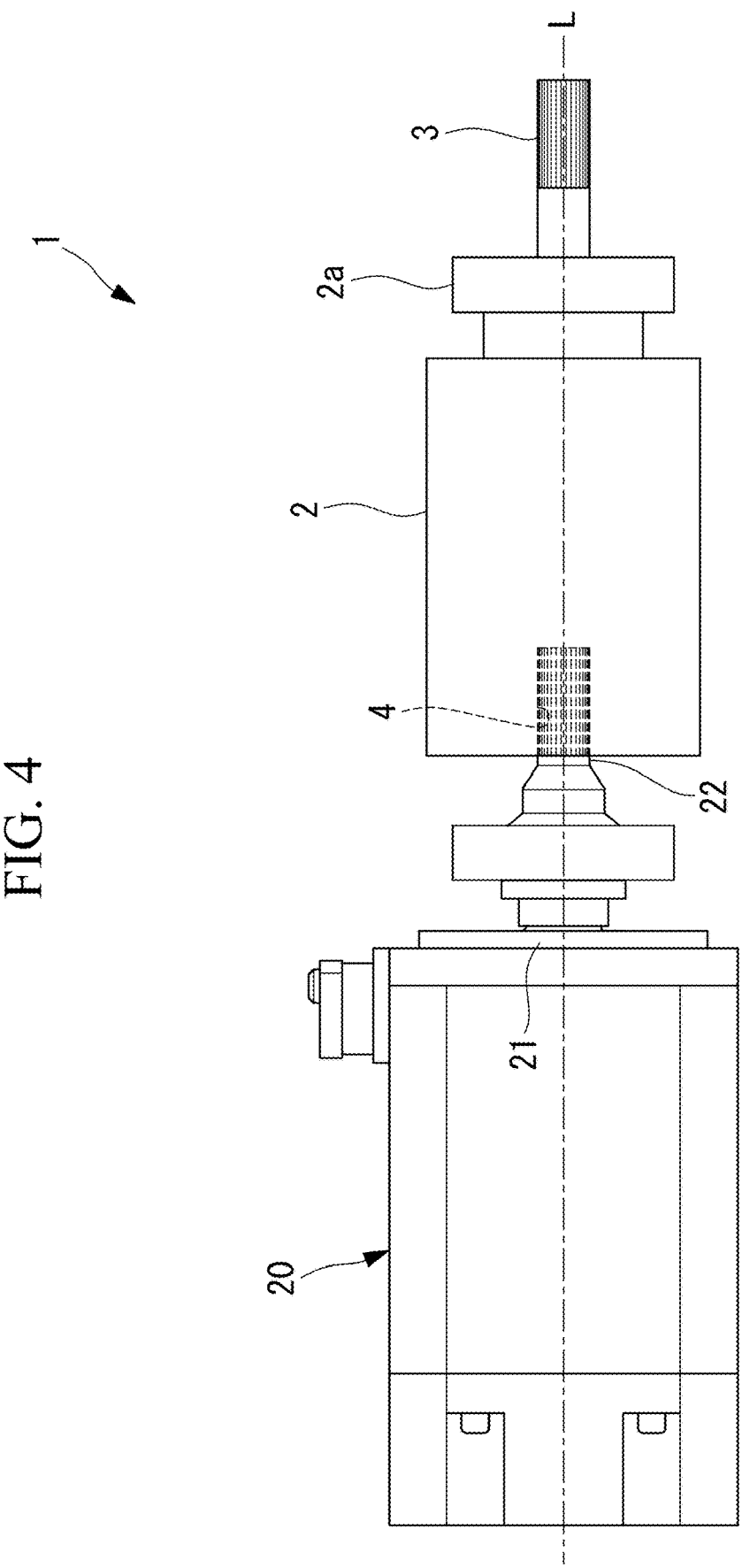
FIG. 4 is a side view showing a motor to which the jig in FIG. 1 is attached.

Next, as shown in FIG. 4, the internal gear part 4 of the jig 1 is meshed with the drive gear 22 of the motor 20 arranged in a posture ready to be attached to the casing 10. Then, in a state in which the internal gear part 4 is meshed with the drive gear 22, the operator checks the position of the mark 5 indicated on the barrel part 2. When the mark 5 is not positioned at the desired position, the operator grips the barrel part 2 with his/her hand and applies, to the barrel part 2, a torque about the axis L greater than or equal to the brake torque of the motor 20. By doing so, it is possible to rotate the drive gear 22 about the axis L while braking the motor 20 and to position the mark 5 at a desired position where, for example, the central vertex of the mark 5 is located vertically upward. This way, the phase of the drive gear 22 is adjusted to a phase in which the drive gear 22 is meshed with the input gear 30 in the casing 10 simply by moving the motor 20 maintained in the posture ready to be attached in the axial direction of the shaft 21.

Then, by removing the jig 1 from the drive gear 22 so as not to rotate the drive gear 22 from this state, the task of adjusting the phase of the drive gear 22 is completed.

Next, the motor 20 with the drive gear 22 whose phase has been adjusted is lifted and inserted into the casing 10 through the opening 11 while being maintained in the posture ready to be attached. Because the phases of the drive gear 22 and the input gear 30 have been adjusted to such phases in which the drive gear 22 and the input gear 30 mesh with each other, the drive gear 22 can be easily meshed with the input gear 30 without rotating the motor 20 by a large amount about the axis of the shaft 21, and the motor 20 can be fixed to the casing 10.

As described above, the jig 1 and the assembly method according to this embodiment have an advantage in that it is possible to easily adjust the phase of the input gear 30, which is disposed at a position difficult for an operator to reach or directly see.

Furthermore, by rotating the shaft 21 of the motor 20 with the brake applied, it is possible to adjust the phase of the drive gear 22 without preparing a power supply and a brake releasing device. Furthermore, because the drive gear 22 can be meshed with the input gear 30 without rotating the motor 20, the motor 20 can be easily mounted into the casing 10 even if the installation space for the motor 20 is small, which is advantageous.

Furthermore, because the jig 1 has both the external gear part 3 and the internal gear part 4, the phases of the drive gear 22 and the input gear 30 can be adjusted with one jig 1. This leads to an advantage in that there is no need to prepare different jigs.

Because the external gear part 3 and the internal gear part 4 are arranged coaxially, the phases of both the external gear part 3 and the internal gear part 4 can be indicated with a single mark 5.

Figure 5:
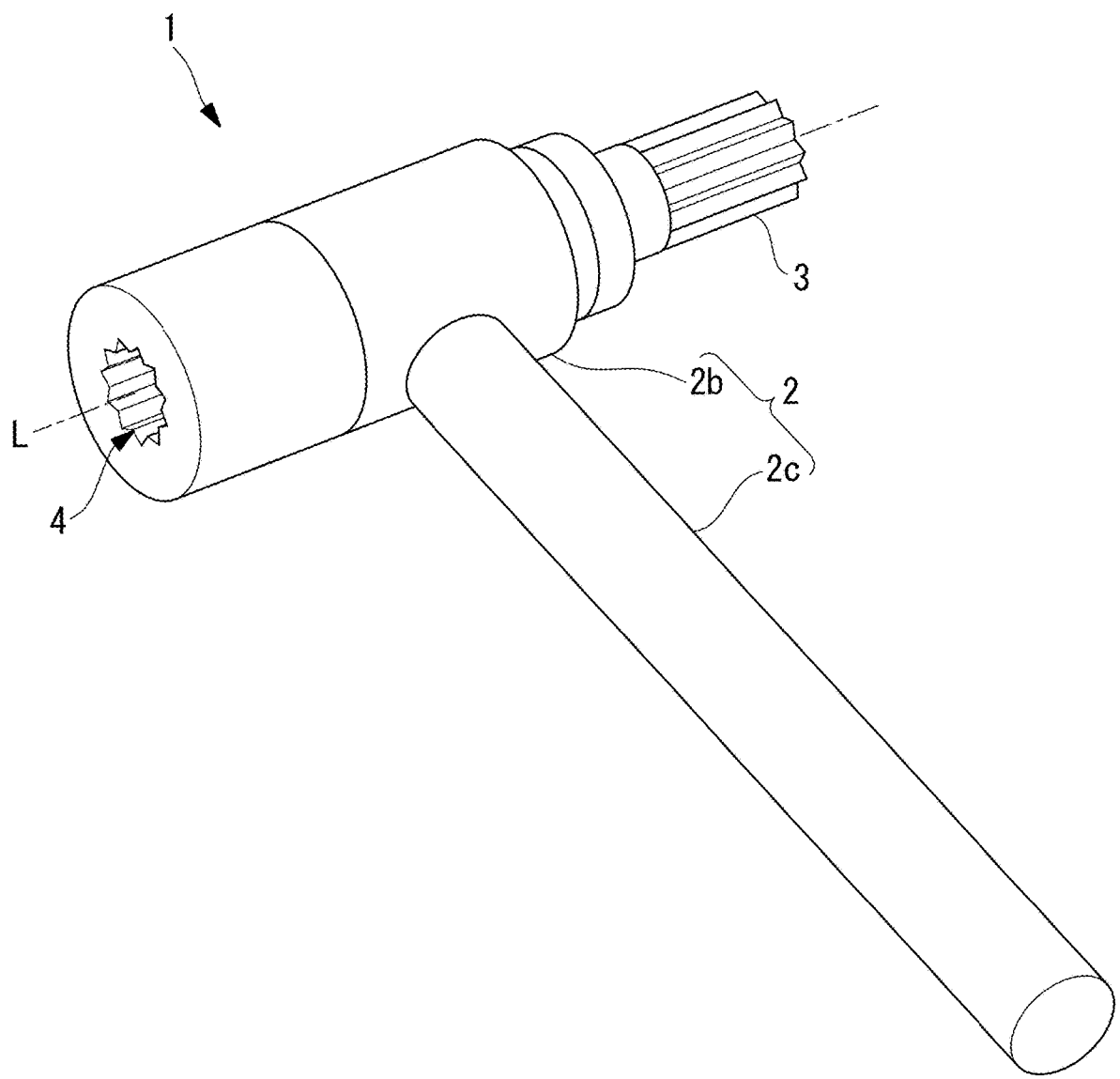
FIG. 5 is a perspective view showing a first modification of the jig in FIG. 1.

In this embodiment, the barrel part 2 has a cylindrical shape having a central axis corresponding to the axis L, and torque is applied by gripping the barrel part 2. Instead, a non-cylindrical columnar barrel part 2 may be employed. Alternatively, as shown in FIG. 5, the barrel part 2 may include a cylindrical main body (application part main body) 2b having a central axis corresponding to the axis L, and a long lever 2c extending radially outward from the outer circumferential surface of the main body 2b.

This allows an operator to apply a larger torque about the axis L by applying a force in the tangential direction about the axis L to the end of the lever 2c. Thus, the phase of the drive gear 22 or the input gear 30 can be adjusted even more easily.

Because the lever 2c has a predetermined phase relationship about the axis L with respect to the external gear part 3 and the internal gear part 4, the lever 2c may be used as a phase indicator. That is, the phase of the drive gear 22 or the input gear 30 may be confirmed by the phase of the lever 2c about the axis L, instead of the mark 5.

Figure 6:
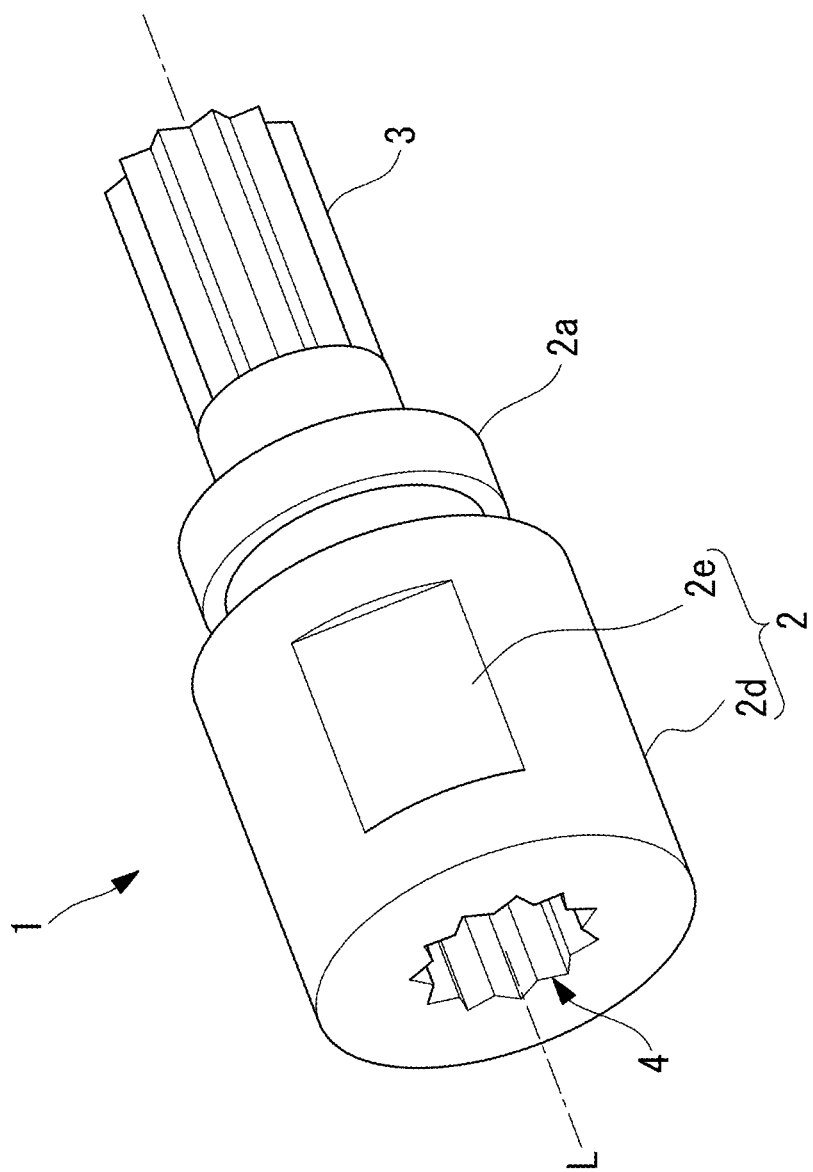
FIG. 6 is a perspective view showing a second modification of the jig in FIG. 1.

In this embodiment, as shown in FIG. 6, the barrel part 2 may include a cylindrical main body (application part main body) 2d extending in the axis L direction, and a tool attachment part 2e provided in the outer circumferential surface of the main body 2d to be engaged with a tool for rotating the main body 2d about the axis L.

The tool attachment part 2e includes, for example, two parallel flat portions formed in the outer circumferential surface of the main body 2d, on both sides of the central axis, such that a tool, such as a spanner, can be engaged therewith.

Also in this case, a larger torque can be applied by applying a force to the tool engaged with the tool attachment part 2e. The phases of the external gear part 3 and the internal gear part 4 may be confirmed by the position of the tool attachment part 2e.

There is another advantage in that the size of the jig 1 can be reduced, because the tool is attached only when the jig 1 is used.

Although a triangular engraving has been shown as an example phase indicator in this embodiment, the mark may have any shape, and, instead of engraving, any method, such as scribing, a sticker, or painting, may be employed.

Although the bearing 2a is provided at one end of the barrel part 2 in this embodiment, the one end of the barrel part 2 may be directly fitted into the opening 11 without providing the bearing 2a.

The jig 1 having both the external gear part 3 and the internal gear part 4 has been described as an example. Instead, as shown in FIG. 7, a jig set 1' including a first jig 1A having the external gear part 3 and a second jig 1B having the internal gear part 4 may be employed.

Figure 7:
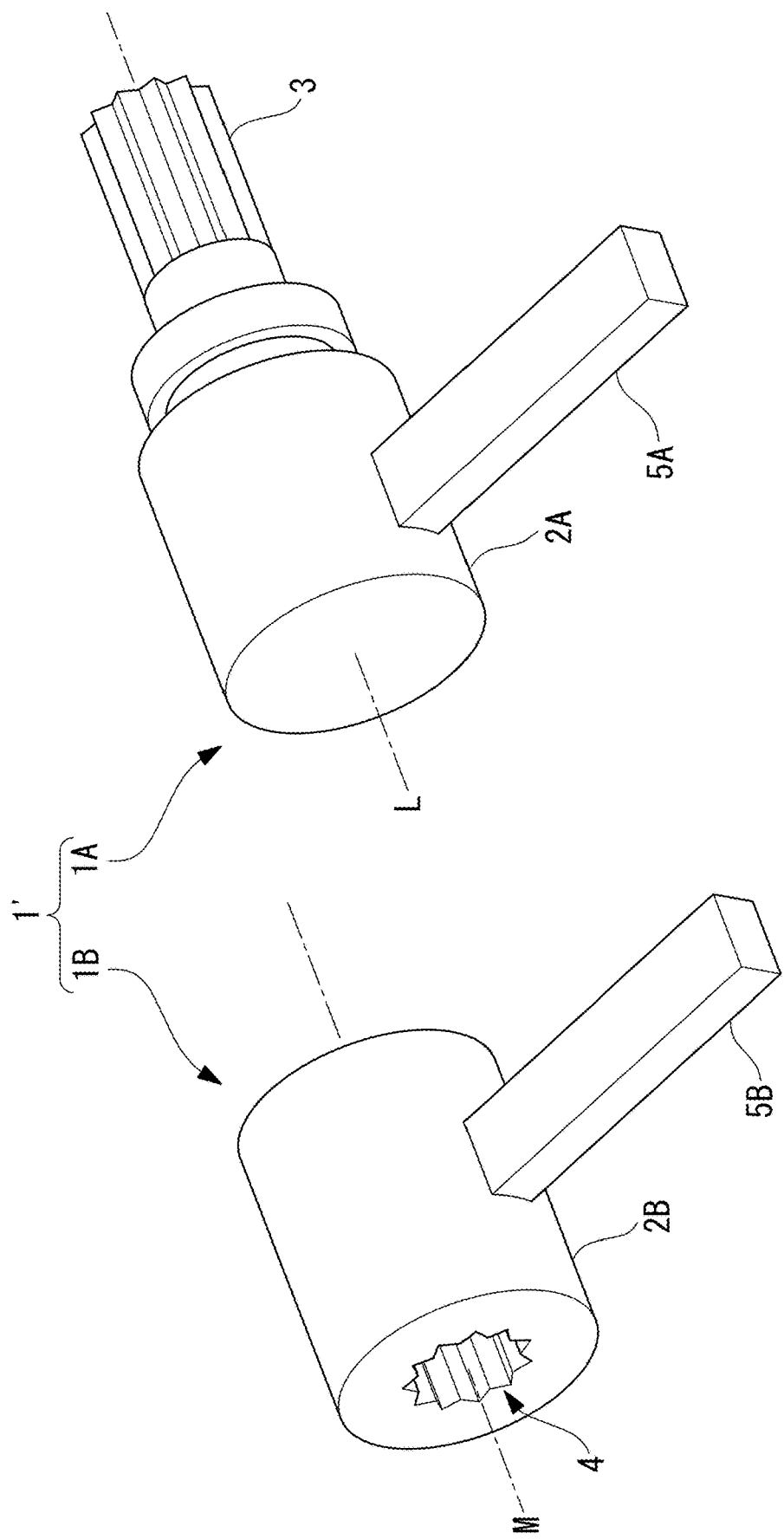
FIG. 7 is a perspective view showing a third modification of the jig in FIG. 1.

In the example shown in FIG. 7, the first jig 1A includes a cylindrical first barrel part 2A having a central axis corresponding to a predetermined axis L, and the external gear part 3 fixed to one end of the first barrel part 2A in the axis L direction. The first barrel part 2A includes a first lever (torque application part, phase indicator) 5A, which extends radially outward from the outer circumferential surface of the first barrel part 2A and allows a force in the tangential direction about the axis L to be applied to the first barrel part 2A.

The second jig 1B includes a cylindrical second barrel part 2B having a central axis corresponding to a predetermined axis (second axis) M, and the internal gear part 4 formed at one end of the second barrel part 2B in the axis M direction. The second barrel part 2B includes a second lever (second torque application part, second phase indicator) 5B, which extends radially outward from the outer circumferential surface of the second barrel part 2B and allows a force in the tangential direction about the axis M to be applied to the second barrel part 2B.

The first lever 5A and the second lever 5B have predetermined phase relationships with respect to the external gear part 3 and the internal gear part 4, respectively.

A robot 200 according to an embodiment of the present disclosure will be described below with reference to the drawings.

Figure 8:
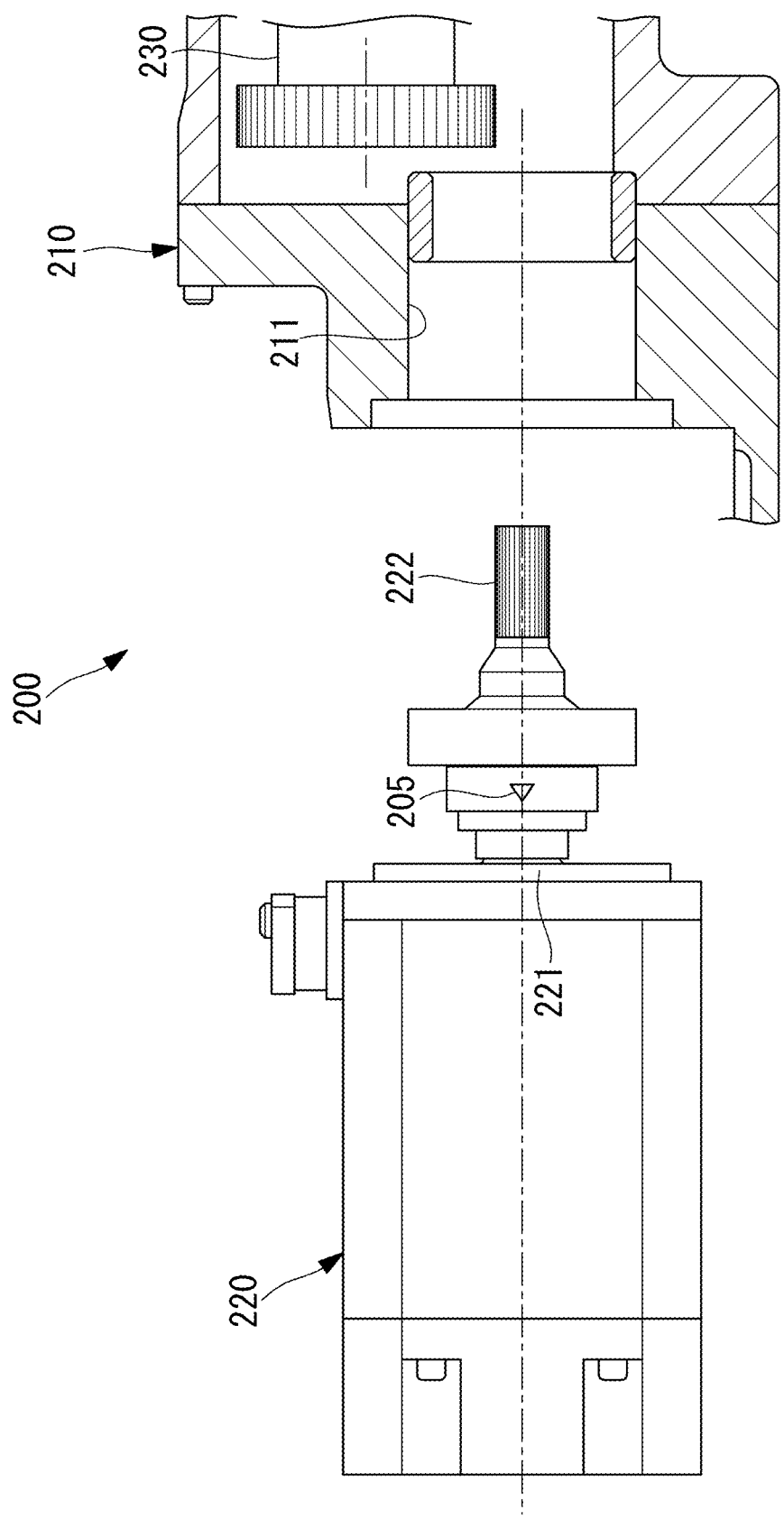
FIG. 8 is a side view showing an exploded state of a part of the robot according to the embodiment of the present disclosure.

As shown in FIG. 8, the robot 200 according to this embodiment includes a casing 210 having an opening 211 and accommodating an input gear 230 therein, and a motor 220 removably attached to the opening 211 in the casing 210. A drive gear 222 that is meshed with the input gear 230 in a state in which the motor 220 is attached to the casing 210 is attached to a shaft 221 of the motor 220.

A mark (phase indicator) 205 having a predetermined phase relationship with respect to the drive gear 222 is provided on the outer circumferential surface of the drive gear 222 at the proximal end.

This allows an operator to adjust the phase of the drive gear 222 to a desired phase without using the jig 1, by checking the phase of the mark 205 before attaching the motor 220 to the casing 210. Hence, by adjusting only the phase of the input gear 230 using the jig 1, the drive gear 222 and the input gear 230 can be arranged in such phases that they can be meshed with each other. Thus, the motor 220 can be easily mounted into the casing 210.

The invention claimed is:

1. A jig, comprising:
   a first gear part configured to be meshed with an input gear disposed in a casing by insertion into the casing from an outside of the casing;
   a torque application part that is fixed to the first gear part, is disposed outside the casing in a state in which the first gear part is meshed with the input gear, and is capable of configured for applying a torque about a first axis, which corresponds to an axis of the first gear part, to the first gear part;
   a phase indicator provided on the torque application part to indicate a phase of the first gear part about the first axis; and
   a second gear part configured to be meshed with a drive gear attached to a shaft of a motor, wherein
   the second gear part is provided coaxially with the first gear part, on an opposite side from the first gear part with the torque application part therebetween in a direction of the first axis, and
   the torque application part is configured to apply a torque greater than a brake torque of the motor to the shaft in a state in which the second gear part is meshed with the drive gear.

2. The jig according to claim 1, further comprising a guide part provided on the torque application part and in contact with the casing to guide relative movement between the first gear part and the input gear in a direction of the first axis and in a rotation direction about the first axis.

3. The jig according to claim 1, wherein the phase indicator is a mark provided on the torque application part.

4. The jig according to claim 1, wherein the torque application part has such a shape that a point of application of a force to be applied in a tangential direction about the first axis can be set at a position away from the first axis in a radially outward direction.

5. The jig according to claim 4, wherein the torque application part includes an application part main body fixed to the first gear part, and a lever extending outward from the application part main body in a radial direction about the first axis.

6. The jig according to claim 5, wherein the phase indicator comprises the lever.

7. The jig according to claim 4, wherein
   the torque application part includes an application part main body fixed to the first gear part, and a tool attachment part provided on the application part main body, and
   the tool attachment part allowing is configured to allow a tool to be engaged with the application part main body about the first axis, in a state in which a handle of the tool extends outward in a radial direction about the first axis.

8. The jig according to claim 7, wherein the phase indicator comprises the tool attachment part.

9. A jig set, comprising:
   a first jig; and a second jig, wherein the first jig includes a first gear part configured to be meshed with an input gear disposed in a casing by insertion into the casing from an outside of the casing, a torque application part that is fixed to the first gear part, is disposed outside the casing in a state in which the first gear part is meshed with the input gear, and is configured for applying a torque about a first axis, which corresponds to an axis of the first gear part, to the first gear part, and a phase indicator provided on the torque application part to indicate a phase of the first gear part about the first axis, the second jig includes a second gear part that can configured to be meshed with a drive gear attached to a shaft of a motor, a second torque application part fixed to the second gear part and capable of applying a torque about a second axis corresponding to an axis of the second gear part, and a second phase indicator that indicates a phase about the second axis, and the second torque application part can is configured to apply a torque greater than a brake torque of the motor to the shaft in a state in which the second gear part is meshed with the drive gear.

10. A method for assembling a robot, the method comprising:

in a state in which the first gear part of the jig according to claim 1 is inserted into the casing and meshed with the input gear, applying a torque about the first axis to the first gear part with the torque application part disposed outside the casing to rotate the input gear;

adjusting a phase of the input gear to a phase in which the input gear can be meshed with a drive gear fixed to a shaft of a motor, on the basis of the phase of the first gear part indicated by the phase indicator;

removing the jig from the casing;

in a state in which the second gear part of the jig is meshed with the drive gear, applying a torque greater than a brake torque of the motor about the first axis to the shaft with the torque application part to rotate the drive gear;

adjusting a phase of the drive gear to a phase in which the drive gear can be meshed with the input gear, on the basis of the phase of the second gear part indicated by the phase indicator;

removing the jig from the drive gear; and attaching the motor to the casing while causing the drive gear to be meshed with the input gear.

* * * * *